Jan. 1, 1957 W. J. GEER 2,775,959
VALVE ROTATOR

Filed Dec. 28, 1953 2 Sheets-Sheet 1

INVENTOR
William J. Geer
BY S. C. Thorpe
ATTORNEY

Jan. 1, 1957 W. J. GEER 2,775,959
VALVE ROTATOR

Filed Dec. 28, 1953 2 Sheets-Sheet 2

INVENTOR
William J. Geer
BY
S. C. Thorpe
ATTORNEY

United States Patent Office 2,775,959
Patented Jan. 1, 1957

2,775,959

VALVE ROTATOR

William J. Geer, Grand Rapids, Mich., assignor to General Motors Corporation, Detroit, Mich., a corporation of Delaware Application December 28, 1953, Serial No. 400,397

12 Claims. (Cl. 123—90)

This invention relates to reciprocating elements such as internal combustion engine poppet valves, and particularly to means for inducing concurrent rotation thereof and employing a radially deflectible resilient member such as a Belleville spring responsive to the axial thrust imposed on the reciprocated element and acting as a brake for limiting the rotation to a single direction.

While prior rotator devices of this general type have heretofore been proposed in which the Belleville spring deflects under increasing thrust load to transmit the thrust between a rotatable part such as a valve return spring retainer rotatably fixed to the valve and a nonrotatable part such as the valve guide through balls arranged to roll on the Belleville spring, it has been found that such prior devices have the objectionable feature that high unit loading of the Belleville spring by the balls creates stresses which aggravate wear and tendencies of the Belleville spring to fatigue in operation. It is accordingly one of the principal objects of the invention to provide an improved device of this general type in which the thrust load is transferred to the Belleville alternately by one or the other of two relatively rotatable members, each of which has a relatively large area of abuttable engagement with the Belleville at substantially different distances radially of the axis of rotation.

It is a further object of the invention to provide various other improvements which simplify the manufacture and improve the operating characteristics of this type of rotator, including the use of two such members having cooperating surfaces accommodating their relative axial movement and acting in response thereto to effect relative rotation of the members, extending such cooperating surfaces helically and substantially 360° about the Belleville axis, interposing balls or other anti-friction shiftable elements between the members in tracks of uniform depth formed in the helical surfaces, and forming abutments to extend between the terminating ends of each helical surface for engagement with opposite ends of a compression spring acting to index the members to their initial relative positions after each rotating operation.

The means by which these and other objects and advantages of the invention are obtained will be readily apparent from the following description of two preferred embodiments thereof selected for purposes of illustration, having reference to the drawings, wherein.

Figure 2:
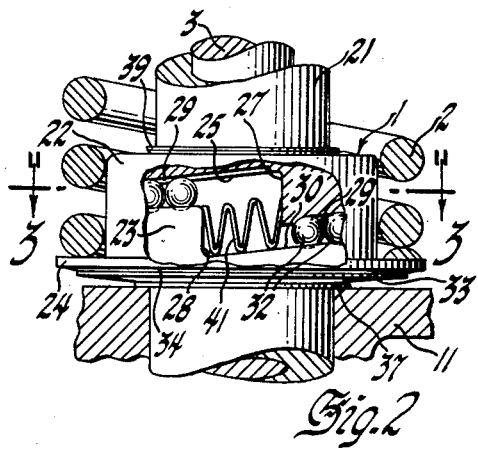
Figure 2 is an enlarged fragmentary view similar to Figure 1, with parts broken away and in section to show details of the rotator.
Figure 3:
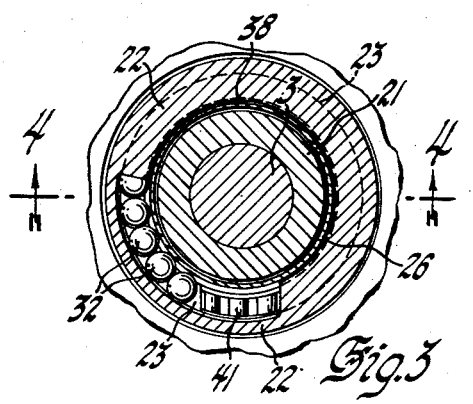
Figure 3 is a segmental view taken substantially on line 3—3 of Figure 2.
Figure 4:
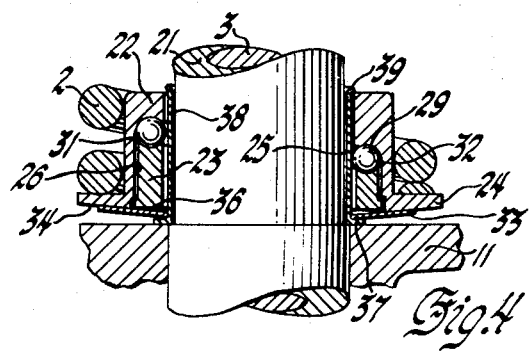
Figure 4 is a segmental view taken substantially on line 4—4 of Figure 3.
Figure 5:
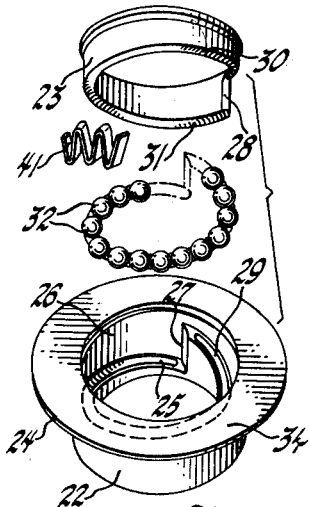
Figure 5 is an exploded view of the principal parts of the rotator of Figure 2 in perspective.
Figure 6:
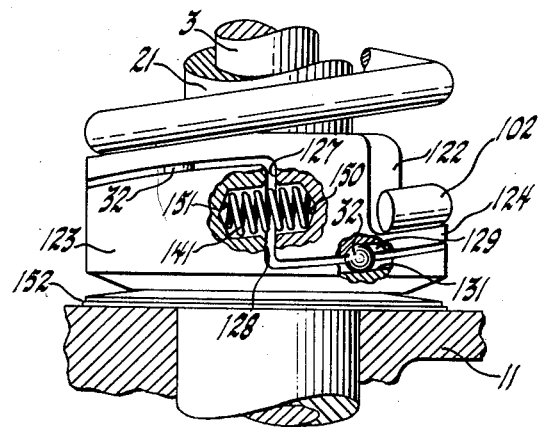
Figure 8:
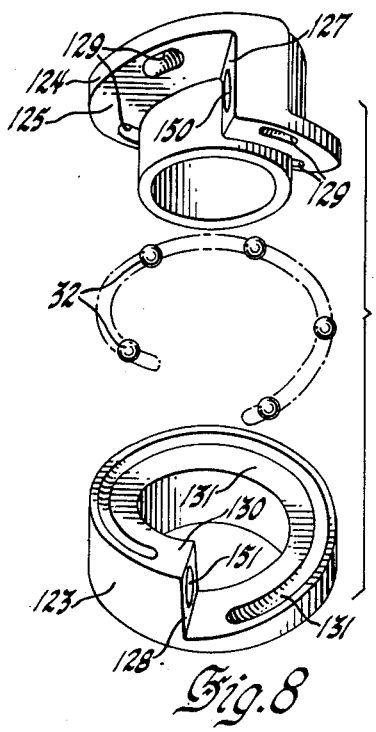
Figure 7:
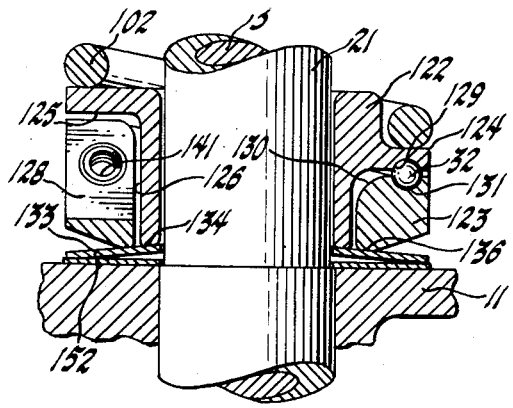

Figures 6, 7, and 8 are views similar to Figures 2, 4 and 5 respectively, but showing a modified form of the rotator.

Figure 1:
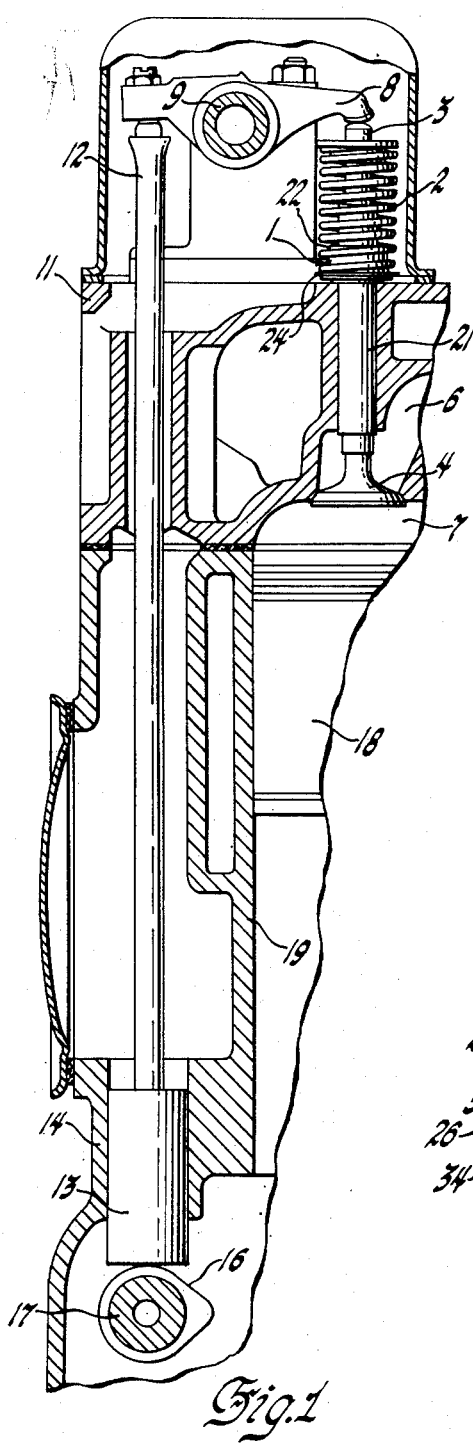
Figure 1 is a fragmentary view of an internal combustion engine valve operating mechanism with one form of my rotator installed between the valve return spring and the engine cylinder head.

Referring now in detail to the drawings, the rotator designated generally by the numeral 1 is shown in Figure 1 as inserted under the lower or dead end of the valve return spring 2 whose opposite end is suitably fixed to rotate and reciprocate with the stem 3 of the engine poppet valve 4. While the poppet valve 4 may of course be reciprocated in any desired manner to control the opening of the valve port 6 to the engine combustion chamber 7, I have illustrated this being accomplished by a rocker 8 mounted for oscillation on a shaft 9 suitably supported on the engine cylinder head 11 with opposite ends of the rocker respectively engaging the upper ends of the valve stem 3 and a push rod 12 whose lower end engages a valve tappet 13 slidably mounted in the engine crankcase 14 and riding on a cam 16 of a camshaft 17 which is suitably journalled and is driven by any conventional means (not shown) in timed relation with the reciprocation of the engine piston 18 in the cylinder bore 19. The usual bushing 21, fixed in the cylinder head 11, guides the valve stem during its rotation and reciprocation.

Referring now particularly to Figures 2–5, the rotator 1 includes a pair of relatively rotatable members 22 and 23 shown as being annular in form and concentrically encircling the valve guide bushing 21 above the top of the cylinder head 11. The upper member 22 has an external flange 24 at its lower end which forms a seat for the lower end of the valve return spring 2 and, because of the thrust and resulting frictional engagement between this flange and the lowermost convolution of the valve return spring, no relative rotation between these parts occurs in operation. The internal periphery of the upper member is axially recessed at 26 to telescopically receive the lower member 23, and the downwardly presenting face 25 of this recess and the upwardly presenting face 30 of the lower member extend helically about the axis of the valve stem throughout approximately 360°. At their circumferentially terminating ends these helical faces are axially interconnected as shown by abutment surfaces 27 and 28 respectively. Formed in each of these helical faces are ball tracks 29 and 31 which extend circumferentially therewith to just short of the abutment surfaces 27, 28 and serve as raceways for a plurality of balls 32 which are arranged loosely adjacent each other thereon so as to have freedom for rolling movement. Opposite the lower ends of the members 22, 23 is a resilient means in the form of a Belleville spring washer 33 which serves to transmit the thrust of the valve return spring 2 to and from one or the other of these members and the cylinder head 11. For this purpose, the annular bottom face 34 of the upper member flange 24 and the annular bottom face 36 of the inner member 23 are made flat, that is, non-helical in relation to the valve stem axis, for uniform clutching engagement with the upper surface of the Belleville. Due to the substantial difference in the mean radial distances of these clutch surfaces 34, 36 from the valve stem axis a variation in their engagement pressure with the upper face of the Belleville occurs as the Belleville deflects radially in response to increasing and decreasing thrust loads transmitted to it by the members 22 and 23.

As best shown in Figures 2 and 4 the Belleville spring has an upwardly presenting dish shape under the thrust load occurring when the engine valve is in its closed position. The inner marginal edge portion of the Belleville seats on the flange 37 at the lower end of a sleeve member 38 which extends axially through the members 22 and 23 and has its upper end 39 spun or flared outwardly over the upper surface of the member 22 to loosely retain the parts assembled for installation and removal as a unit. The flange 37 on this sleeve member also serves as a spacer between the Belleville spring and the cylinder head, thus isolating the Belleville and cylinder head from relative wear between them and insuring a uniform flat seating surface for the Belleville free from any casting defects or irregularities on the upper surface of the cylinder head.

Interposed between the abutment surfaces 27, 28 of the respective members 22, 23 and laterally guided in the recess 26 by the sleeve member 38 is a compression spring 41 which is formed as an undulated strip of spring sheet metal as best illustrated in Figure 5. This spring 41 biases the members 22 and 23 rotatively of each other about the valve stem axis in a direction to move the upper member towards the valve spring 2 and the lower member 23 towards the Belleville spring 33. In so doing, the balls 32 are caused to roll upwardly on the ball track 31 of the lower member to the maximum extent permitted by the axial spacing of the lower member 23 between the balls and the upper surface of the Belleville spring.

In operation, as the poppet valve 4 is moved downwardly from its position shown in Figure 1 towards its open position, compressing the valve return spring 2, the increased thrust of the return spring 2 is transmitted through the upper member 22 by its flange 24 against the Belleville spring 33. This increased thrust load on the Belleville spring results in its radial deflection from the dished shape shown to a flattened or oppositely dished shape, the inner marginal portion thereof pivoting on the spacer flange 37. Due to the fact that the outer periphery of the Belleville moves axially at a greater rate than its portions inwardly thereof during such flexure, the pressure of engagement between the upper surface of the Belleville and the upper member flange surface 34 tends to decrease more rapidly than the engaging pressure between the lower member surface 36 and the Belleville, with the result that the valve return spring thrust load is transferred from the upper member 22 to the lower member 23, which in turn permits the upper member 22 to rotate about the axis of the valve stem on the balls 32 while the lower member 23 is held against such rotation by its frictional engagement with the Belleville spring. By reason of the valve return spring being frictionally coupled to the upper member flange 24 and also being operatively fixed to the valve stem, such rotation of the upper member produces a simultaneous rotation of the valve during the valve opening movement. Such relative rotation of the members 22 and 23 is yieldingly opposed by the spring means 41.

Upon the poppet valve reaching its maximum open position, the upper member will thus have rotated a sufficient amount to then or immediately thereafter regain its clutching engagement with the Belleville spring, preparatory to return or closing stroke of the valve. During such return stroke, as the valve spring thrust is relieved and the Belleville returns to its initially dished condition the portion of the Belleville engaged by the upper member clutch face 34 moves upwardly at a greater rate than the Belleville portion opposite the clutch face 36 of the lower member, and as a result the frictional engagement between this surface 36 and the Belleville is decreased sufficiently for the lower member 23 to be rotatively indexed to its initial position relative to the upper member 22 by the spring 41. As will be appreciated, this rotation of the lower member likewise causes the balls 32 to roll to their original positions without inducing retrograde rotation of the valve return spring 2 or the valve 4. During each succeeding valve opening and closing strokes the same relative movements of the parts take place whereby a progressive intermittent unidirectional rotation of the valve is accomplished.

The modification of the invention illustrated in the Figures 6-8 differs principally from that previously described in that the upper member 122 has its valve seating flange 124 extending helically thereof to conform with an unsquared end convolution of the valve return spring 102, and has its outer rather than its inner periphery recessed as at 126 to receive the lower member 123. As a result, the Belleville clutching surface 134 at the bottom of the upper member is disposed inwardly of the clutching surface 136 of the lower member relative to the valve stem axis, and to provide for the valve stem 3 to rotate during the valve opening movements the Belleville spring 133 is oppositely dished in its normal condition from that of the previously described Belleville 33. Also, in this modification the relative rotation between the upper and lower members 122, 123 and the thrust loads transmitted between them is provided for by a lesser number of balls 32 having a single ball track 131 in the upper end face 130 of the lower member 123 and individual ball tracks 129 formed in circumferentially spaced relation about the recess 126 of the upper member. These individual ball tracks 129 may be of uniform depth relative to the under surface 125 of the flange 124 to conform with the helix angle of the single ball track 131 in the lower member, and are made sufficiently elongated to accommodate a substantial angular relative rotation of the upper and lower members. Also, as best shown in Figures 6 and 8 the abutment surfaces 127 and 128 are relieved by blind openings 150 and 151 respectively to receive opposite ends of a coil compression spring 141 which serves to rotatably return the members in the manner similar to that of spring 41. Serving as a seat for the outer marginal portion of the Belleville spring 133 and spacing the same from the engine cylinder head 11 is a flat washer 152 whose inner periphery is piloted by the valve stem bushing 21.

The operation of this form of my rotator is essentially the same as that previously described, except that by reason of the Belleville spring 133 being oppositely dished the inner marginal portion thereof which is clutchably engaged with the surface 134 of the upper member will move axially of the valve stem at a greater rate with increased thrust than the portion of the Belleville which is engageable with the more radially outer clutch surface 136 of the lower member. The same effect, however, occurs during such flexure of the Belleville under increasing thrust loads of the engine valve spring, of causing the Belleville spring to release the upper member for rotation about the valve stem while transmitting the thrust load through the balls and the lower member to the Belleville and maintaining sufficient pressure on the lower member clutch surface 136 to restrain the lower member from rotating. Similarly, during the return stroke of the valve, the more rapid axial displacement of the Belleville inner marginal portion relative to its axial movement opposite the lower member clutch surface 136 causes the upper member to be restrained from retrograde rotation while accommodating return rotation of the lower member and the balls to their initial positions.

It will be appreciated that while only two specific embodiments have been shown and described for purposes of illustrating the invention, obviously minor changes and rearrangements of the various parts, such as oppositely dishing the Belleville spring to effect valve rotation during closing, substitution of a single ball track for the individual tracks 129, etc., may be made without departing from the spirit and scope of the invention which I now claim.

I claim:

1. A device for inducing intermittent unidirectional rotation between two parts in response to alternately increasing and decreasing thrust application to one of the parts longitudinally of their axis of rotation, comprising two relatively rotatable members adapted to be interposed in thrust between said parts with the respective axes of relative rotation of said members and parts substantially aligned, said members having longitudinally aligned oppositely facing surfaces and correspondingly facing surfaces, said oppositely facing surfaces cooperating with each other under thrust forces urging them together to rotatively drive one of the members relative to the other in one direction while accommodating axial movement of said one member in a direction toward the other, means resiliently opposing relative rotation of said members in said one direction, and a resilient member having a first surface adapted to thrustably and non-rotatably engage one of said parts and a second surface facing and in thrust transmitting and rotation resisting frictional engagement alternately with said correspondingly facing surfaces as said relatively rotatable members move axially toward and away from each other with increasing and decreasing thust applications to said one part, respectively.

2. A device adapted to be inserted between one end of a return spring for a reciprocably actuated element and the spring retaining means for effecting progressive axial rotation of said element relative to said retaining means in response to cyclic contraction and expansion of said return spring in operation, comprising a thrust bearing and a Belleville spring at one end of said bearing, said Belleville spring being collapsible under the increased thrust imposed on said bearing during contraction of said return spring, said bearing having two relatively rotatable members with oppositely facing helically disposed thrust surfaces in cooperative bearing relation and other surfaces facing and engageable with the axially adjacent face of said Belleville spring, said Belleville spring having its said face in rotation resisting frictional engagement with said other surface of one of said members during contraction of said return spring and deflectable out of said engagement and into rotation resisting frictional engagement with said other surface of the other member during expansion of said return spring, and resilient means opposing rotation of said other member during contraction of said return spring.

3. A device adapted to be inserted between one end of a return spring for a reciprocably actuated element and the spring retaining means for effecting progressive axial rotation of said element relative to the retaining means in response to cyclic contraction and expansion of the return spring during reciprocation of said element, comprising a rotary thrust bearing and a Belleville spring axially adjacent said bearing, said Belleville spring being collapsible under the increased thrust imposed on said bearing during contraction of said return spring, said bearing having two relatively rotatable members with helically disposed thrust surfaces in cooperative bearing relation and other surfaces facing and engageable with the axially adjacent face of said Belleville spring, said Belleville spring having its said face in rotation resisting frictional engagement with said other surface of one of said members during contraction of said return spring and deflectable out of said engagement and into rotation resisting frictional engagement with said other surface of the other member during expansion of said return spring, and resilient means opposing rotation of said other member during contraction of said return spring.

4. A device adapted to be inserted between one end of a return spring for a reciprocably actuated element and the spring retaining means for effecting progressive axial rotation of said retaining means relative to said spring in response to cyclic contraction and expansion thereof with reciprocation of said element, comprising a rotary thrust bearing and a Belleville spring in coaxial longitudinally adjacent relation with said bearing, said Belleville spring being collapsible under a thrust load intermediate the minimum and maximum loads to be imposed on the return spring in operation, said bearing having two relatively rotatable members with facing helical bearing surfaces cooperating in response to thrust transmission therebetween rotatively drive one of the members relative to the other in one direction and other surfaces facing and engageable with the axially adjacent face of said Belleville spring, said Belleville spring having its said face in rotation resisting frictional engagement with said other surface of said other member during increased loading of said return spring and deflectable out of said engagement and into rotation resisting frictional engagement with said other surface of said one member during decreased loading of said return spring, and resilient means opposing rotation of said other member during contraction of said return spring.

5. The combination with a poppet valve having a stem, fixed means supporting the stem for reciprocation and axial rotation and a valve return spring reacting in thrust against said means, of a device for inducing progressive rotation of the stem in response to cyclic increase and decrease in thrust imposed on the spring during reciprocation of the valve, said device comprising a pair of members having oppositely facing cooperative bearing surfaces extending helically of the stem and clutch surfaces correspondingly facing longitudinally of the stem in spaced apart relation laterally of the stem, one of said members being rotatably fixed to the stem, a resilient member embracing the stem and in series thrust relation with the spring between the valve and said fixed means, said resilient member having a surface in thrust transmitting and rotation resisting frictional engagement with one of said clutch surfaces when said valve is at one end of its reciprocatory stroke and deflectable radially out of said engagement and into thrust transmitting rotation resisting frictional engagement with the other of said clutch surfaces in response to movement of the valve to the opposite end of its stroke, and spring means reacting against each of said pair of members for effecting their relative rotation about the stem while said resilient member is disengaged from the clutch surface of said one of said pair of members.

6. A device for inducing intermittent unidirectional rotation between two parts in response to reciprocatory movement therebetween longitudinally of their axis of relative rotation, comprising a pair of members adapted to be inserted between said parts with one of said members rotatively coupled to and in direct thrust transmitting relation with said one part, said members having cooperative bearing portions extending helically of said axis, resilient means adapted to be inserted between said members and the other of said parts and rotatively coupled to and in direct thrust transmitting relation with said other part, said resilient means having a surface in thrust transmitting and rotation resisting frictional engagement with one of said members during axial movement of said parts toward each other and deflectable out of said engagement and into engagement with the other of said members at a distance transversely of said axis from said first named engagement during axial movement of said parts away from each other, and other resilient means reacting against each of said members in opposition to relative helical movement of their bearing portions in the direction accommodating axial movement of said parts toward each other.

7. In combination with a poppet valve having a stem and fixed means supporting the stem for reciprocation and axial rotation having a surface facing generally longitudinally of the stem, a coil compression spring reacting in thrust against said means, said coil spring embracing the stem and having one end operatively fixed thereto, said coil spring terminating at its other end with a convolution having a substantial pitch axially of the stem, a pair of members interposed axially of the stem between said spring and said surface having cooperating bearing raceway portions extending helically of the stem and corresponding substantially in pitch with said convolution, rollable elements between said raceway portions accommodating relative rotation of the members, and resilient means opposing said relative rotation in the direction induced by axial movement of the members toward each other, each of said members having a flange extending toward said surface concentrically of the stem, said flanges being radially spaced from each other, and a stem embracing radially deflectable resilient member reacting in series thrust relation with the spring between the valve and said fixed means, said resilient member having a face in thrust transmitting and rotation resisting frictional engagement with one of said flanges when the valve is at one end of its stroke and deflectable out of said engagement and into thrust transmitting rotation resisting frictional engagement with the other of said flanges in response to movement of the valve to the opposite end of its stroke.

8. In combination with a poppet valve having a stem and fixed means supporting the stem for reciprocation and axial rotation having a surface extending laterally of the stem and facing generally longitudinally thereof, a coil compression spring reacting in thrust against said means, said spring embracing and having one end operatively fixed to the stem, said spring having a plurality of convolutions in longitudinally spaced relation between said end and said surface and terminating at its end nearest said surface with a convolution longitudnally spaced from its adjacent convolution and disposed angularly to said surface, and other means interposed between said terminating convolution and said surface for transmitting thrust therebetween and effecting intermittent progressive rotation of the spring coaxially of the stem in response to increasing and decreasing thrust loads imposed on the spring by reciprocatory movements of the stem, said other means including a Belleville spring encircling the valve stem and reacting adjacent one of its marginal extremities against said surface, a pair of members movable relative to each other longitudinally of the spring and interposed between the Belleville spring and said terminating convolution, said members having oppositely facing cooperative bearing surfaces extending helically of the stem, bearing means between said bearing surfaces for transmitting thrust therebetween and effecting relative rotation of said members in one direction in response to movement of the members toward each other, said members having portions correspondingly facing longitudinally of the stem for engagement with the Belleville spring at different distances radially thereof from its said one marginal extremity, and resilient means reacting against each of said members in opposition to their relative rotation in said one direction, one of said members being rotatably fixed to the stem and having a surface thrustably seating said terminating convolution and conforming in angularity therewith to said first named surface, said Belleville spring having a face in thrust transmitting and rotation resisting frictional engagement with one of said member portions when the valve is at one end of its stroke and deflectable out of said engagement and into thrust transmitting and rotation resisting frictional engagement with said portion of said other member in response to movement of the valve to the opposite end of its stroke.

9. A device for insertion in thrust transmitting relation between one end of a poppet valve coaxially operating return spring and the retaining means for said spring end to induce progressive rotation of the valve during rotation, comprising a Belleville spring flexible to and from a dished condition with change in magnitude of the return spring thrust transmitted thereto during valve reciprocation and having one marginal edge cooperable with means associated with the valve and return spring to maintain the Belleville spring in substantial alignment with the axis of valve rotation, two members having relative longitudinal and rotary movement coaxially of the Belleville spring, said members having annular surfaces engageable with respective portions of the Belleville spring in concentric relation to each other between said marginal edge and the laterally opposite marginal edge of the Belleville spring, said members having other surfaces provided with oppositely presenting ball tracks extending helically of the axis of said annular surfaces and terminating with cooperative abutment surfaces in spaced circumferentially facing relation, a plurality of balls engaging said ball tracks and spacing said other surfaces apart, said ball tracks being of sufficient length to accommodate rolling of the balls a distance therealong whose component axially of said annular surfaces corresponds to the relative axial displacement of the Belleville spring portions during each stroke of the valve, and a compression spring biasing said abutment surfaces apart.

10. In combination, a Belleville spring, two members having an axis of relative rotation substantially coincident with the Belleville spring axis, one of said members having a recess axially facing the Belleville spring and encompassing said axes, said one member having a surface laterally adjacent said recess engageable with the Belleville spring to transmit thrust and restrain relative rotation between said one member and the Belleville spring, the other of said members being telescopically received in said recess and having a surface engageable oppositely thereof with the Belleville spring to transmit thrust and restrain relative rotation between said other member and the Belleville spring, anti-friction means interposed between said members in said recess accommodating axial movement of the members toward each other and acting to induce relative rotation of the members in one direction in response to their said axial movement, biasing means operatively engaging said members and resiliently opposing their relative rotation in said one direction.

11. In combination, a Belleville spring, two members having an axis of relative rotation substantially coincident with the Belleville spring axis, one of said members having a recess axially facing the Belleville spring and encompassing the other of said members, said one member having a surface laterally adjacent said recess engageable with the Belleville spring to transmit thrust and restrain relative rotation between said one member and the Belleville spring, the other of said members being telescopically received in said recess and having a surface engageable oppositely thereof with the Belleville spring to transmit thrust and restrain relative rotation between said other member and the Belleville spring, anti-friction means interposed between said members in said recess accommodating axial movement of the members toward each other and acting to induce relative rotation of the members in one direction in response to their said axial movement, biasing means operatively engaging said members and resiliently opposing their relative rotation in said one direction, and a member forming a seat for the end of the Belleville spring remote from said surfaces and having an extension engageable with said one member to restrain the parts in assembled relation.

12. In combination, a Belleville spring, two members encompassing the axis of the Belleville spring and relatively movable to each other along and about said axis, said members having concentric thrust transmitting surfaces engageable with the same end of the Belleville spring in laterally spaced relation to one marginal edge of the Belleville spring, and means operatively associated with each of said members and reacting therebetween to rotatively drive one of said members about said axis in response to its axial movement relative to the other of said members.

References Cited in the file of this patent

UNITED STATES PATENTS

| | | |
|---|---|---|
| 2,397,502 | Ralston | Apr. 2, 1946 |
| 2,582,060 | Newton | Jan. 8, 1952 |
| 2,648,319 | Ralston | Aug. 11, 1953 |
| 2,662,511 | Sward | Dec. 15, 1953 |